US010202239B2

(12) United States Patent
Razumov

(10) Patent No.: US 10,202,239 B2
(45) Date of Patent: Feb. 12, 2019

(54) MULTI-LEVEL STORAGE SYSTEM WITH TRANSPORTATION DEVICES MOVABLE IN SUBSTANTIALLY PERPENDICULAR DIRECTIONS AND METHOD OF TRANSFERRING CONTAINERS IN DESIRED SEQUENCE

(71) Applicant: OTTOS CONSULTANTS LTD., Paralimni (CY)

(72) Inventor: Sergey N. Razumov, Moscow (RU)

(73) Assignee: Atool Trading Ltd., Limassol (CY)

( * ) Notice: Subject to any disclaimer, the term of this patent is extended or adjusted under 35 U.S.C. 154(b) by 0 days.

(21) Appl. No.: 15/597,678

(22) Filed: May 17, 2017

(65) Prior Publication Data
US 2018/0093829 A1 Apr. 5, 2018

Related U.S. Application Data

(63) Continuation of application No. 14/178,024, filed on Feb. 11, 2014.

(51) Int. Cl.
B65G 1/04 (2006.01)
B65G 1/06 (2006.01)

(52) U.S. Cl.
CPC ......... B65G 1/0471 (2013.01); B65G 1/0485 (2013.01); B65G 1/0492 (2013.01); B65G 1/065 (2013.01)

(58) Field of Classification Search
CPC ...... B65G 1/0471; B65G 1/0492; B65G 1/04; B65G 1/0485; B65G 1/065; B65G 1/1378; B65G 1/1373; B65G 1/1375
See application file for complete search history.

(56) References Cited

U.S. PATENT DOCUMENTS 3,779,403 A 12/1973 Young
4,265,582 A 5/1981 Theobald
(Continued)

FOREIGN PATENT DOCUMENTS

DE 10 2009 017 241 A1 10/2010
DE 10 2009 021 467 A1 11/2010
JP 49-127377 A 12/1974
(Continued)

OTHER PUBLICATIONS

International Preliminary Report on Patentability PCT/IB2015/000053 dated Aug. 16, 2016.
(Continued)

Primary Examiner — Mark C Hageman
(74) Attorney, Agent, or Firm — McDermott Will & Emery LLP

(57) ABSTRACT

A storage system having multiple storage sections, each configured for storing containers arranged in multiple rows at various horizontal levels with respect to ground. Multiple lifting transportation devices are configured for moving in a first horizontal direction along pairs of first rails arranged at predetermined horizontal levels in passages between the storage sections so as to take containers stored in the adjacent storage sections and place them to a selected row of the adjacent storage sections. At least one container carriage is configured for moving in a second horizontal direction substantially perpendicular to the first horizontal direction so as to take the containers placed in the selected row and move them in the second horizontal direction.

17 Claims, 22 Drawing Sheets

(56) References Cited

U.S. PATENT DOCUMENTS 4,690,601 A 9/1987 Delius et al.
6,113,336 A 9/2000 Chang et al.

FOREIGN PATENT DOCUMENTS

| JP | 7-117815 A | 5/1995 |
| JP | 2000-44010 A | 2/2000 |

OTHER PUBLICATIONS

Written Opinion of the International Searching Authority PCT/IB2015/000053 dated Apr. 24, 2015.
International Search Report PCT/IB2015/000053 dated Apr. 24, 2015.

MULTI-LEVEL STORAGE SYSTEM WITH TRANSPORTATION DEVICES MOVABLE IN SUBSTANTIALLY PERPENDICULAR DIRECTIONS AND METHOD OF TRANSFERRING CONTAINERS IN DESIRED SEQUENCE

TECHNICAL FIELD

This disclosure relates to retail logistics, and more particularly, to a multi-level storage system in a warehouse, fulfillment center or retail store using transportation devices movable in substantially perpendicular horizontal directions in different horizontal planes so as to provide point-to-point transfers of containers.

BACKGROUND ART

Typical warehouse operations include handling and storage of products in order to efficiently receive inventory, store it, collect products from different containers to prepare orders, and ship orders to customers. Handling and storage of products in a storage system involve a number of in-storage inventory transfers performed within the warehouse. After containers with products are received and moved to an initial storing location, products are often moved within the facility for storage or order selection. Further, after an order for product shipment is received, it is necessary to collect the required products to fulfill the order and move orders to a shipping area.

Several transfer movements are required in a typical warehouse. First, products are moved from the receiving area to a remote storage location. Additional movements may be required prior to order assembly, depending upon warehouse operating procedures. To fulfill an order, products are usually transferred from a storage area to a picking area. Finally, prepared orders are moved from a picking area to a shipping dock for loading to outbound transportation means.

In traditional storage systems, transfer movements are carried out using a combination of lift trucks, conveyors, and manual processes. However, such transfer operations are slow, and involve complex logistics and substantial labor cost when a large number of orders must be processed.

Therefore, it would be desirable to develop storage systems capable of performing in-storage transfer operations in a quick and efficient manner.

Also, there is a need for transferring containers within a storage system or out of a storage system in a predetermined sequence.

For example, during an order processing procedure when multiple orders are fulfilled at the same time, different orders may require collection of products from different containers. To increase the efficiency of the order fulfillment and the throughput of the storage system, it would be desirable to deliver containers to a picking area in a predefined sequence so as to enable a picking device or operator to pick products required to fulfill processed orders sequentially. For instance, to fulfill the first order, products stored in containers 1 and 2 may be required, to fulfill the second order, products from containers 3 and 4 may be needed, and to fulfill the third order, products from containers 5 and 6 should be delivered. In this case, it would be desirable to produce a sequence of containers in which containers 3 and 4 follow containers 1 and 2, and containers 5 and 6 follow containers 3 and 4.

Also, an order may include multiple products that should be packed in a specific sequence. For example, heavy products need to be placed at the bottom of the container, while lightweight products may be placed after the heavy products. In this case, to efficiently fulfill the order, it would be desirable to deliver containers with the heavy products before containers with the lightweight products.

Further, trucks used for shipping orders from a warehouse or fulfillment center should be loaded in accordance with order destinations so as to make it possible to unload containers delivered to closer destinations without unloading the remaining containers from the truck. In this case, it would be desirable to transfer containers to truck loading ports in an order determined by containers' destinations.

SUMMARY OF THE DISCLOSURE

In accordance with one aspect of the disclosure, the present disclosure offers a storage system having multiple storage sections, each configured for storing containers arranged in multiple rows at various horizontal levels with respect to ground. Multiple lifting transportation devices are configured for moving in a first horizontal direction along pairs of first rails arranged at predetermined horizontal levels in passages between the storage sections so as to have access to containers arranged in the storage sections.

Each lifting transportation device movable along a corresponding pair of the first rails between adjacent storage sections is configured to include a container access mechanism movable in a vertical direction with respect to the corresponding pair of rails so as to take a container stored in the adjacent storage sections and place the container to a selected row of the adjacent storage sections.

At least one container carriage is configured for moving in a second horizontal direction substantially perpendicular to the first horizontal direction. The container carriage is further configured for taking the container placed to the selected row and moving the container in the second horizontal direction.

Each lifting transportation device and the at least one container carriage are configured for moving in different horizontal planes with respect to the ground so as to avoid interferences between the lifting transportation devices and the at least one container carriage.

The selected row of the storage sections is arranged at a horizontal level between a horizontal plane for moving a lifting transportation device and a horizontal plane for moving the at least one container carriage.

In an exemplary embodiment, the container carriage may be movable in the second horizontal direction along a pair of second rails.

The first rails may be arranged above the selected row of the storage sections, and the second rails may be arranged below the selected row.

The container carriage may include a board for carrying the containers, and may be configured for raising the board so as to take the container from the selected row.

Multiple container carriages may be provided in the storage system for carrying containers along respective pairs of the second rails arranged below the selected row of the storage sections.

In accordance with another aspect of the disclosure, a method of transferring containers in a desired order is offered. The method uses multiple lifting transportation devices movable along respective pairs of first rails in a first horizontal direction in passages between storage sections configured for storing containers arranged in multiple rows at various horizontal levels with respect to ground. The method also uses at least one container carriage movable in a second horizontal direction substantially perpendicular to the first horizontal direction.

The following steps are performed to provide a desired sequence of containers:

selecting a group of containers stored in the storage sections for transferring to a predetermined destination in a prescribed order, controlling lifting transportation devices for moving the containers of the selected group in a vertical direction to the selected row of the storage sections, and controlling the at least one container carriage for sequentially moving the containers of the selected group from the selected row for delivery to the predetermined destination in the prescribed order.

In accordance with a further aspect, a desired sequence of containers may be provided using multiple container carriages movable in the second horizontal direction.

In this case, the selected group of containers may be divided into a number of subgroups. Lifting transportation devices may be controlled for moving the containers of the subgroups in a vertical direction to the selected row of the storage sections.

A container carriage may be assigned to each of the subgroups. Each assigned container carriage may be controlled to move containers of a corresponding subgroup from the selected row in a direction of the predetermined destination so as to deliver the containers of the selected group in the prescribed order.

Each lifting transportation device and the at least one container carriage may move in different horizontal planes with respect to the ground so as to avoid interferences between the lifting transportation devices and the at least one container carriage.

The selected row of the storage sections may be arranged at a horizontal level between a horizontal plane for moving a lifting transportation device and a horizontal plane for moving the at least one container carriage.

The container carriage may move in the second horizontal direction along a pair of second rails.

The first rails may be arranged above the selected row of the storage sections, and the second rails may be arranged below the selected row.

If the method is implemented using multiple container carriages, each of them may move along respective pairs of the second rails.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using exemplary storage environment discussed below. It will become apparent, however, that the concept of the disclosure is applicable to any storage system using transportation devices movable in substantially perpendicular horizontal directions in different horizontal planes.

Figure 1:
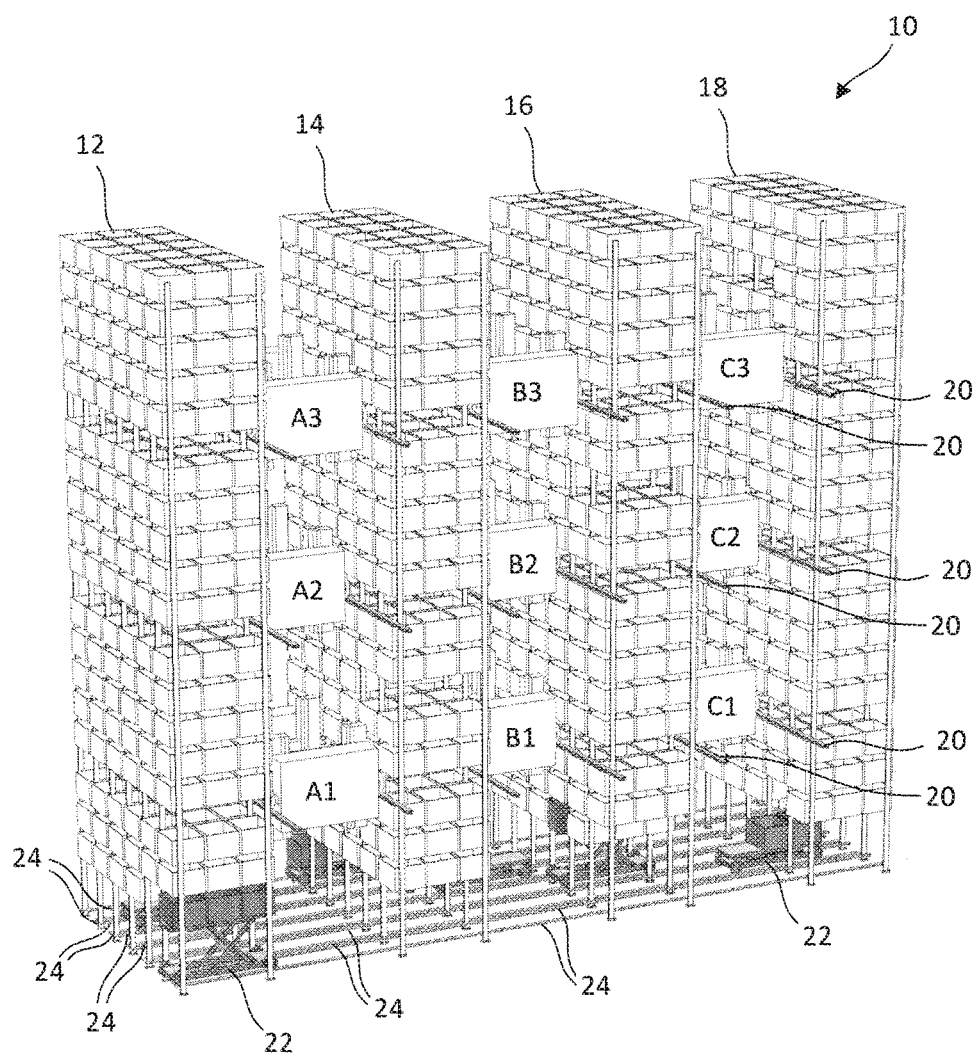
FIG. 1 shows an exemplary storage system of the present disclosure.

FIG. 1 illustrates an exemplary embodiment of a storage system 10 in accordance with the present disclosure. The storage system 10 may be arranged in a warehouse, fulfillment center or retail facility for storing products. The storage system 10 may include not only a storage area, but also a picking area in which products are collected to fulfill customers' orders.

The storage system 10 may include storage racks 12, 14, 16 and 18, each of which is configured for storing containers arranged in a vertical direction in multiple rows at various horizontal levels with respect to the ground. The containers may be any objects capable of holding goods stored in the storage area, such as cartons, boxes, crates, or pallets.

As shown in FIG. 1, each row of the storage rack may contain multiple containers arranged in two mutually perpendicular horizontal directions. The storage racks 12, 14, 16 and 18 may be arranged so as to provide passages between adjacent racks. Lifting transportation devices may be provided in the passages to handle containers stored in adjacent section racks from both sides of the corresponding passage. For example, lifting transportation devices A1, A2 and A3 may be arranged in the passage between the storage racks 12 and 14 to handle containers stored in these racks, lifting transportation devices B1, B2 and B3 may be arranged in the passage between the storage racks 14 and 16, and lifting transportation devices C1, C2 and C3 may be arranged in the passage between the storage racks 16 and 18.

Although FIG. 1 shows an example in which several lifting transportation devices are provided in each passage, the concept of the present disclosure is applicable to a storage system using a single lifting transportation device between the adjacent storage sections, or using one or more lifting transportation devices to serve a single storage section.

The lifting transportation devices are configured for moving in a horizontal direction along corresponding pairs of rails 20 arranged at multiple horizontal levels in each passage so as to have access to containers arranged in storage racks on both sides of the passage. In particular, the rails 20 provided for the transportation devices A1, B1 and C1 are arranged below the rails 20 provided for the transportation devices A2, B2 and C2, and the rails 20 provided for the transportation devices A3, B3 and C3 are arranged above the rails 20 for the transportation devices A2, B2 and C2.

As discussed in more detail below, each lifting transportation device includes a frame movable along a selected pair of rails and a movable platform configured to move up and down with respect to the frame so as to handle containers provided above and below the corresponding pair of rails 20. In particular, a lifting transportation device may load a container from one selected row of the adjacent storage racks, and may unload that container to another selected row of the storage racks. The container may be unloaded to the same storage rack from which the container is taken. Alternatively, the container may be loaded from one storage section served by the transportation device and unloaded to the other storage rack served by the transportation device.

Further, the system 10 includes container carriages 22 movable in a horizontal direction substantially perpendicular to the horizontal direction in which the lifting transportation devices move. For example, the container carriages 22 may be configured for moving along corresponding pairs of rails 24 that may be arranged in the same horizontal plane in a horizontal direction substantially perpendicular to the direction of the rails 20. The pairs of rails 24 may be arranged below a selected row of the storage racks 12, 14, 16 and 18 so as to enable the container carriage 22 to access containers held in the selected row. Also, the container carriage 22 may be configured to move along a single rail 24, or to move without rails at all. As discussed in more detail below, each container carriage 22 may have a board for carrying containers. The board may be raised with respect to the rails 24 so as to take a container from the selected row or to place the container to the selected row.

For example, the rails 24 may be arranged on the floor of the storage facility. Multiple pairs of rails 24 may be arranged in parallel so as to provide access of the respective container carriages 22 to containers held in the selected row above the respective pairs of rails 24.

To avoid interferences between the container carriages 22 and the lifting transportation devices A1-A3, B1-B3 and C1-C3, the pairs of rails 24 and the pairs of rails 20 are arranged on different horizontal planes with respect to the ground so as to provide movement of each container carriage 22 and each lifting transportation device in different horizontal planes with respect to the ground.

Each of the lifting transportation devices A1-A3, B1-B3 and C1-C3 is configured to take a container stored in any row of the adjacent storage racks and place the container to a selected row accessible by the container carriages 22. The selected row is arranged at a horizontal level between a horizontal plane for moving a lifting transportation device and a horizontal plane for moving a container carriage. For example, FIG. 1 shows that the lowest row of the storage racks 12, 14, 16 and 18 is accessible by the container carriages 22 movable along the respective pairs of rails 24 below the respective containers of the lowest row in the storage racks 12, 14, 16 and 18.

The storage system 10 provides a point-to-point transfer of a container using a lifting transportation device to transfer the container from a point in which the container is stored in the storage section to a transit storage point in a selected row, and then using a container carriage to transfer the container from the transit point in the selected row to a desired destination point. For example, containers may be transferred to a picking area in which a picking device or operator collects required products from the containers to fulfill an order.

The point-to-point transfer of the present disclosure makes it possible to transfer containers without using expensive container transferring systems such as a conveyor system. In addition, the point-to-point container transfer of the present disclosure substantially reduces the time required to transfer containers between various points in the storage system.

FIG. 1 shows that the horizontal level corresponding to the storage row accessible by the container carriages 22 is below the horizontal plane in which rails 20 for moving the lifting transportation devices A1, B1 and C1 are arranged, but above the horizontal plane in which rails 24 for moving the container carriages 22 are provided. However, the concept of the present disclosure is also applicable to the storage arrangement in which the container carriages 22 are provided above the lifting transportation devices. For example, the container carriages 22 may be configured as cable cars movable in a horizontal direction above the storage racks to take the containers from a selected row of the storage racks.

Although FIG. 1 shows multiple container carriages 22 for transferring containers from the respective storage locations in the selected row, the system 10 may be implemented using a single container carriage 22 configured for accessing all required storage locations in which containers delivered by the lifting transportation devices are held.

Figure 2:
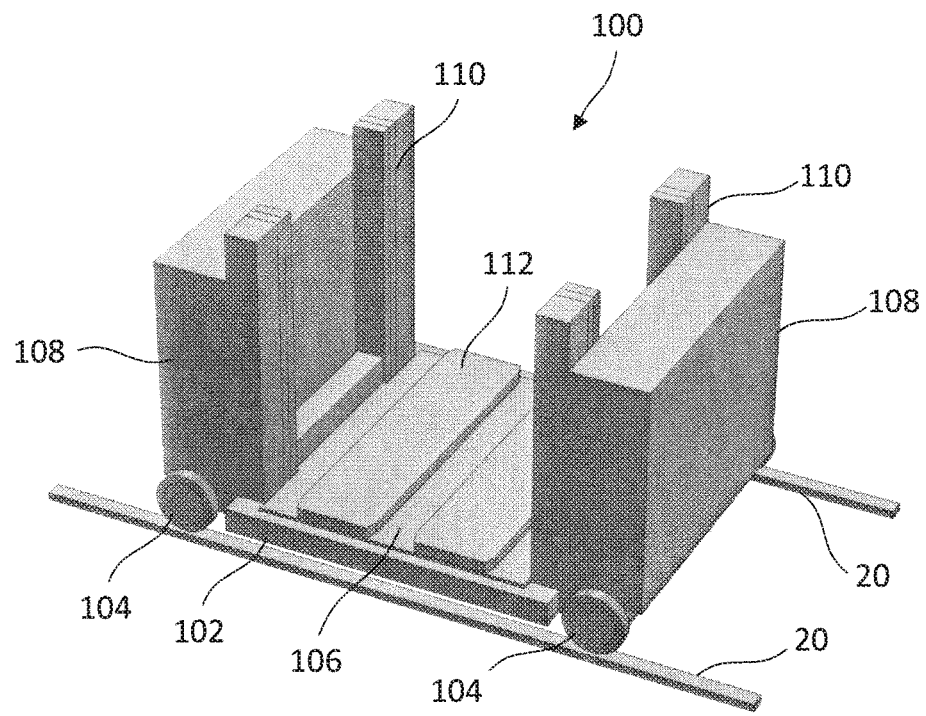
FIGS. 2-5 illustrate exemplary configurations of a lifting transportation device that may be used in the storage system of the present disclosure.

FIGS. 2-5 schematically illustrate an exemplary embodiment of the lifting transportation device that may be used in the storage system 10. As shown in FIG. 2, a lifting transportation device 100 may include a frame 102 with four wheels 104 fixed to the frame 102 which may be formed as a braced structure for supporting elements required to operate the lifting transportation device 100. Each wheel 104 may be attached to the frame 102 so as to rotate in a vertical plane about an axis extending from the center of the wheel 104 in order to move the transportation device 100 along the rails 20.

The frame 102 may hold a movable platform 106 that can be used for carrying containers. For example, the platform 106 may be a rectangular metal plate configured to accommodate containers. Side walls 108 may be provided on the frame 102 to support loading and carrying containers.

The platform 106 may move in a vertical direction up and down with respect to the frame 102 so as to access containers arranged in rows above and below the level at which the rails 20 are arranged. A platform lifting mechanism 110 may be arranged at the side walls 108 to move the platform 106 in a vertical direction. The platform lifting mechanism 110 may be implemented using any well-known mechanisms for moving a plate up and down. For example, a telescopic mechanism can be utilized.

One or more handling elements 112 may be mounted on the platform 106 and configured for operating with containers. The handling elements 112 may take one or more containers from one row of the storage rack, place the container onto the transportation unit 100 for carrying to another row, and remove the container from the transportation device 100 for placing it at a selected row. The handling elements 112 may be extended in a horizontal direction from one or both sides of the transportation device 100 so as to handle containers arranged at one storage rack or both storage racks served by the transportation device 100. For example, the handling elements 112 may be implemented as a metal plate, spade, fork or pulling device.

Figure 3:
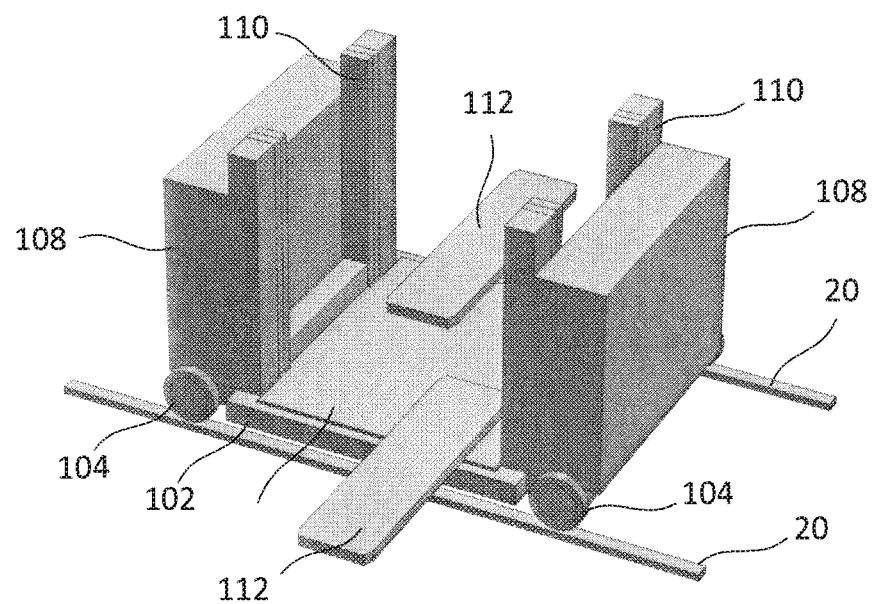
Figure 4:
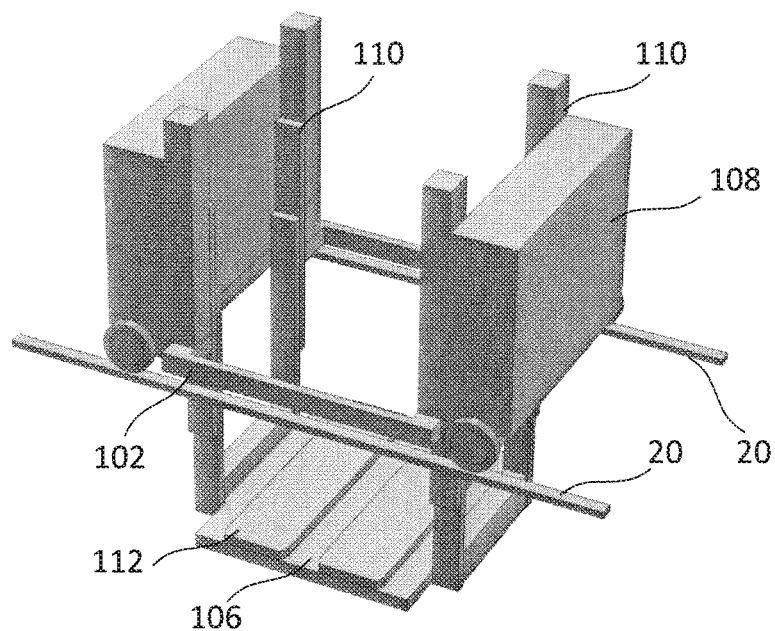
Figure 5:
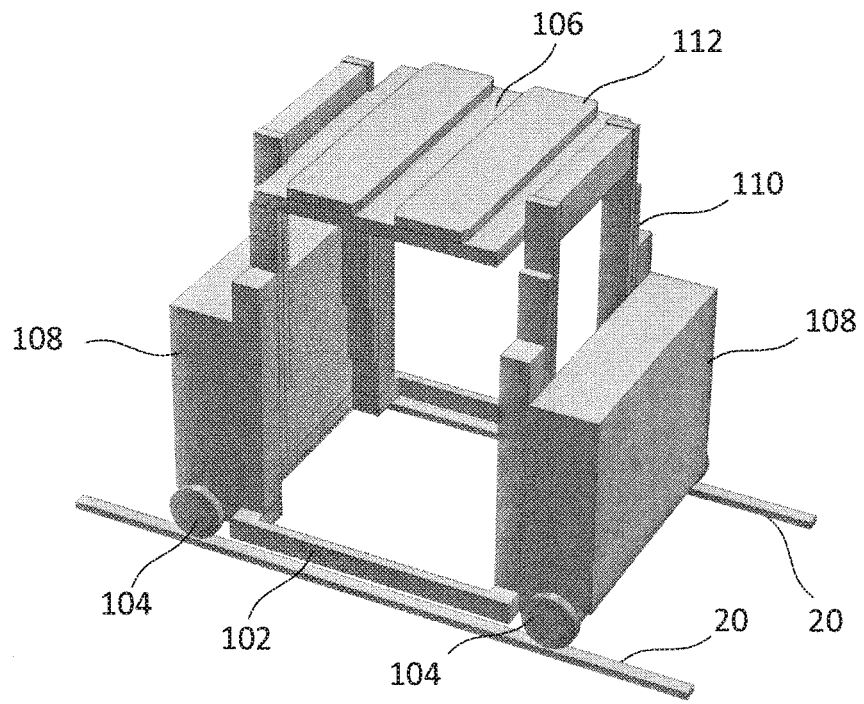

FIG. 3 illustrates the lifting transportation device 100 with the handling elements 112 extended from both sides of the lifting transportation device 100. FIG. 4 illustrates the lifting transportation device 100 with the movable platform 106 moved down with respect to the frame 102 so as to handle containers arranged in rows below the level of the corresponding rails 20. FIG. 5 illustrates the lifting transportation device 100 with the movable platform 106 raised with respect to the frame 102 so as to handle containers arranged in rows above the level of the corresponding rails 20.

The operations of each lifting transportation device 100 may be controlled by a controller that may include a data processor responsive to external commands for processing the commands and producing various control signals. The controller may communicate with various elements of the lifting transportation unit 100 to supply control signals to the elements of the transportation unit 100 and receive responses.

FIGS. 2-5 show a lifting transportation device having the wheels 104 attached at the lower portion of the frame 102. However, the wheels 104 may be attached at the upper portion of the frame 102 or at the middle portion of the frame 102. An exemplary transportation device that can be used as a lifting transportation device in the storage system 10 is described in more detail in my copending U.S. patent application Ser. No. 14/049,552 filed on Oct. 9, 2013 and entitled "AUTOMATIC ORDER PICKING SYSTEM AND METHOD IN RETAIL FACILITY," and in my copending U.S. patent application Ser. No. 14/155,976 filed on Jan. 15, 2014 and entitled "TRANSFERRING CONTAINERS IN STORAGE SYSTEM," both incorporated herewith by reference.

Due to ability of transportation devices to move the platform 106 up and down in a horizontal direction, adjacent transportation devices arranged at the same passage between storage racks can simultaneously operate with containers arranged at the same row. For example, the transportation device A1 may load one or more container from a row in the storage section 12. At the same time, the transportation device A2 may unload one or more containers to the same row. To avoid interference between the transportation devices A1 and A2 when both of them cross the same point, the platform 106 of the transportation device A1 may be moved down and/or the platform 106 of the transportation device A2 may be moved up. As a result, the storage system 10 can provide a high-speed transfer of containers from any slot of the storage racks to another slot in a selected row of the storage racks accessible to the container carriage 22.

FIGS. 6-9 illustrate operations of exemplary container carriages 22 that can be used in the system 10 of the present disclosure. The container carriage 22 may include a frame 220 with four wheels 240 fixed to the frame 220 which may be formed as a braced structure for supporting elements required to operate the container carriage, 22. Each wheel 240 may be attached to the frame 220 so as to rotate in a vertical plane about an axis extending from the center of the wheel 240 in order to move the container carriage 22 along the rails 24.

The frame 220 may hold a board 260 that can be used for carrying containers. For example, the board 260 may be a rectangular metal plate configured to accommodate containers. A pantograph mechanism 280 may be provided on the frame 220 to raise the board 260 with respect to the frame 220 in order to place containers on the board 260, or to move the board 260 down to a folded position so as to enable the container carriage 22 to move under the row of containers.

Figure 6:
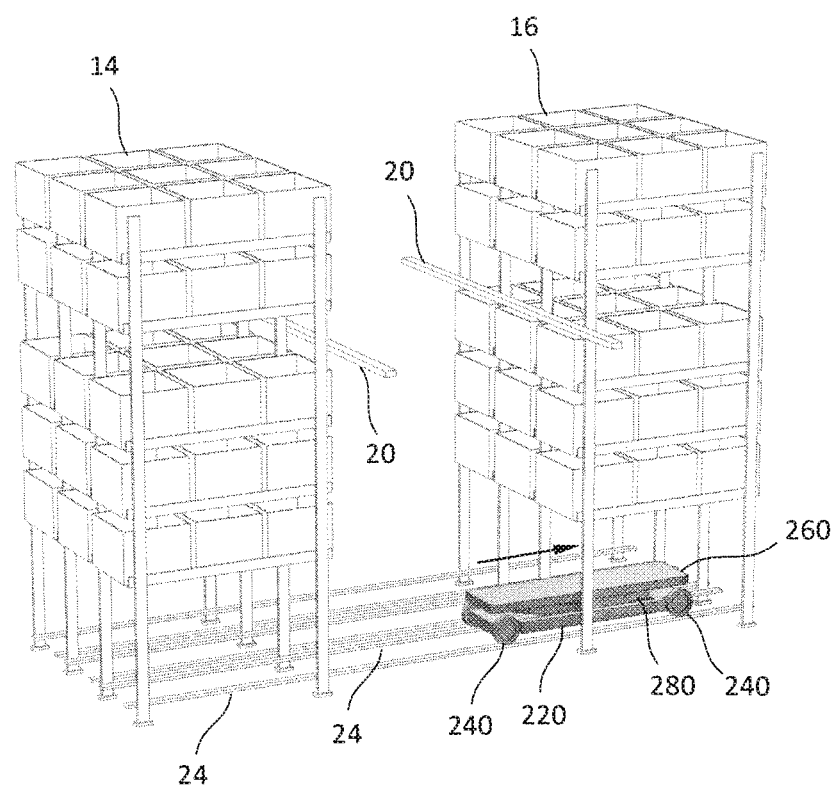
FIGS. 6-9 illustrate operations of exemplary container carriages that can be used in the storage system.
Figure 7:
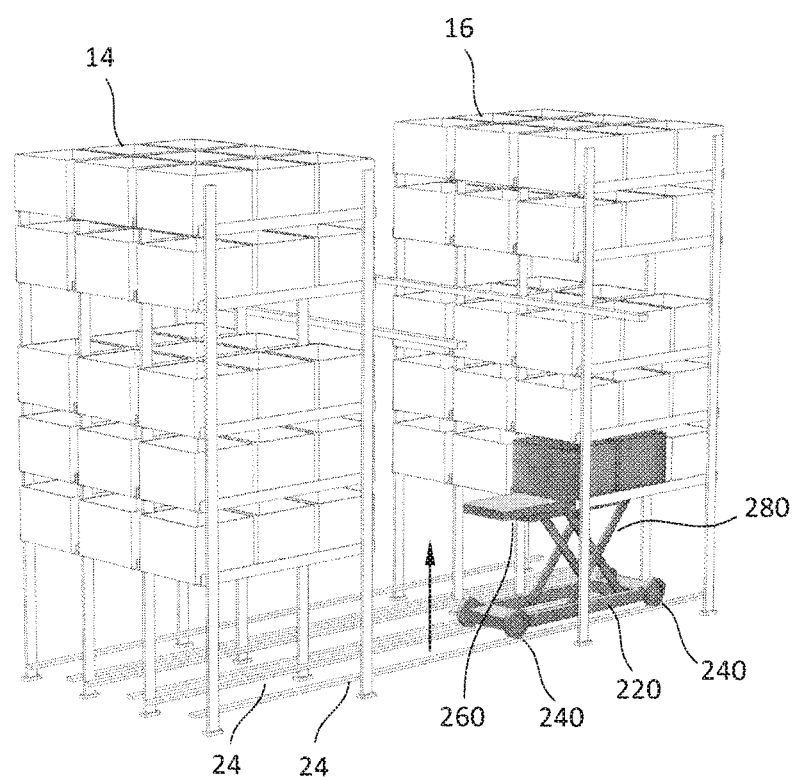

As shown in FIG. 6, the container carriage 22 with the board 260 in a folded position may be moved along a respective pair of rails 22 to a location under storage cells at which one or more selected containers are held. Thereafter, as shown in FIG. 7, using the pantograph mechanism 280, the board 260 may be raised slightly above the lowest vertical level of the respective storage row to place the selected containers on the board 260. The size of the board 260 in a direction perpendicular to the rails 22 may be selected so as to be less than the distance between holding elements that hold containers in the storage racks.

Figure 8:
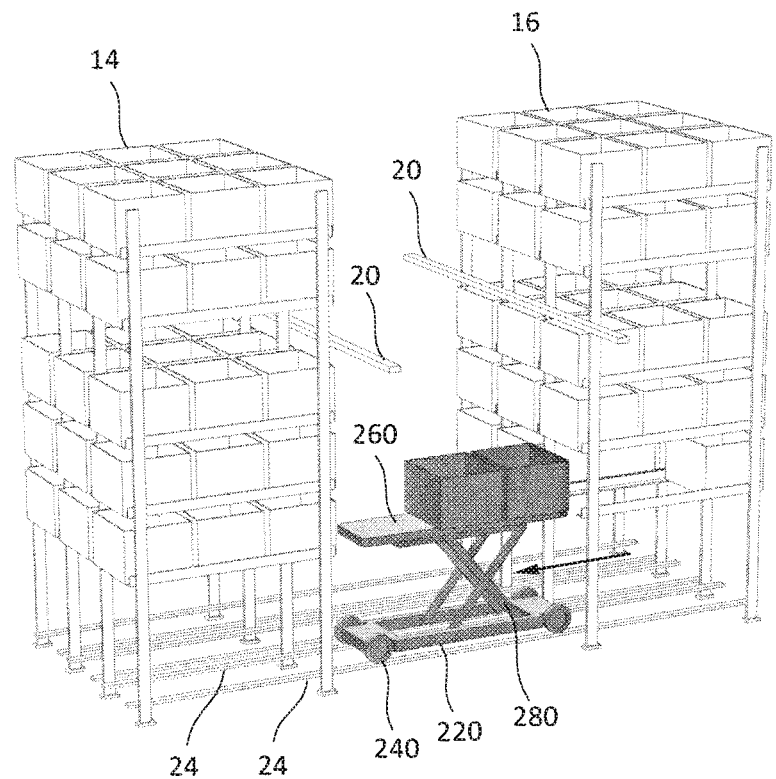
Figure 9:
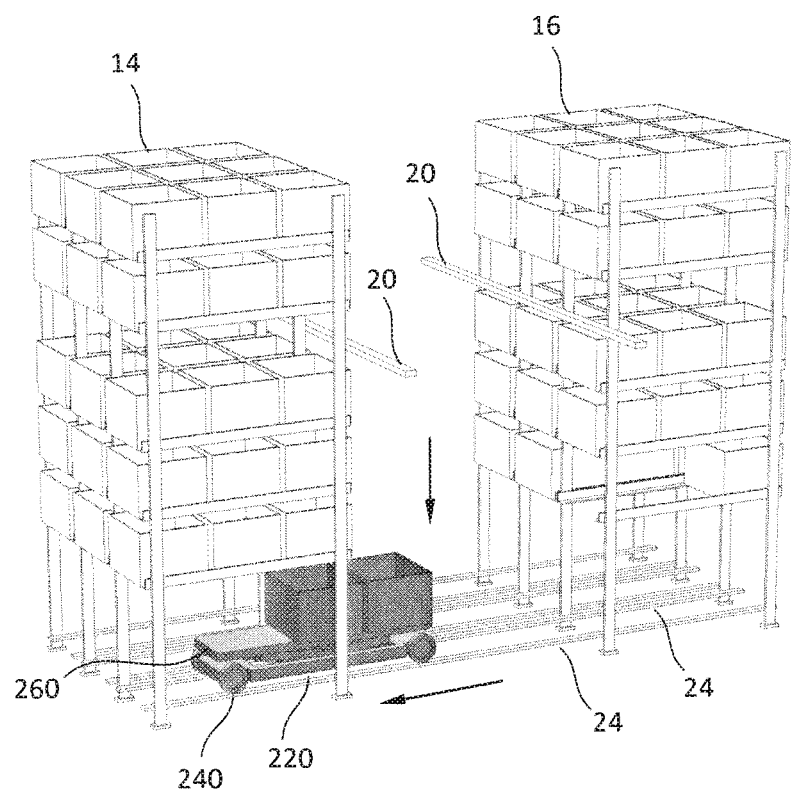

As shown in FIG. 8, when the containers are placed on the board 260, the container carriage 22 may be moved to a location in the passage between the storage racks. The board 260 carrying the containers is moved down to a folded position in which the container carriage 22 can pass under the storage rows (FIG. 9). The operations of each container carriage 22 may be controlled by a controller that may include a data processor responsive to external commands for processing the commands and producing various control signals.

FIGS. 10-17 illustrate exemplary operations performed by the container carriage 22 to move a container from one storage rack to another storage rack. For example, a lifting transportation device (not shown) may place a container 300 to a transit point in a selected row of the storage rack 16. The container carriage 22 may move the container 300 from the transit point to a desired destination point in a selected row of the storage rack 12.

Figure 10:
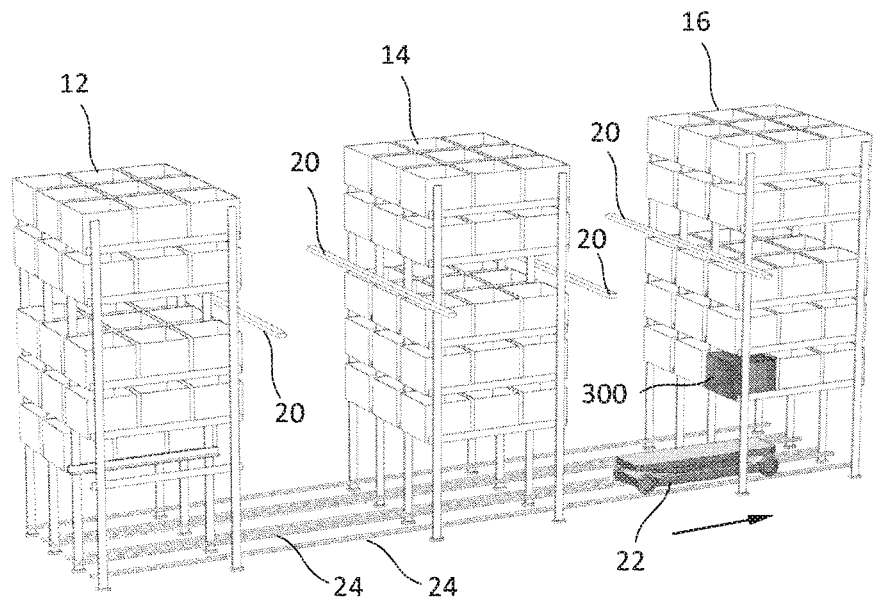
FIGS. 10-17 illustrate exemplary operations performed by the container carriage to move a container from one storage rack to another storage rack.
Figure 11:
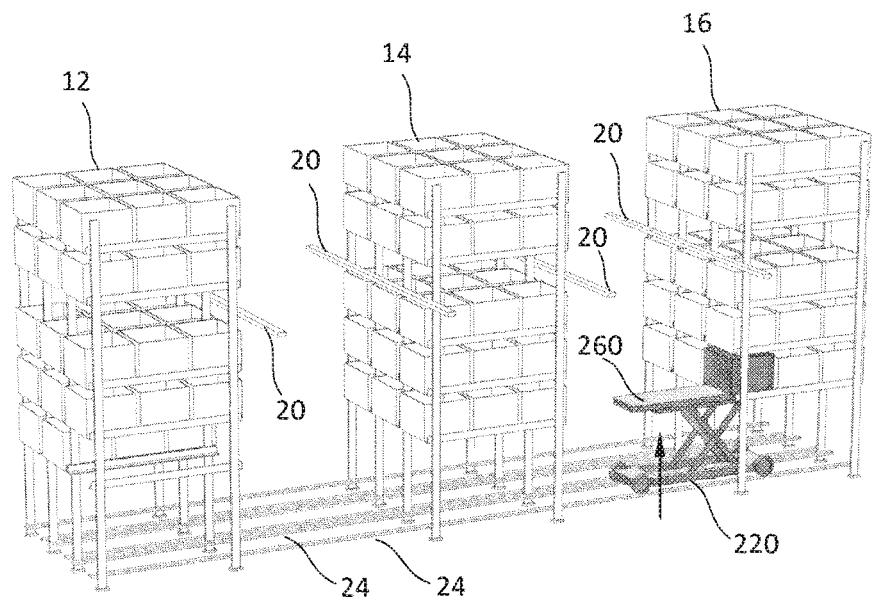
Figure 12:
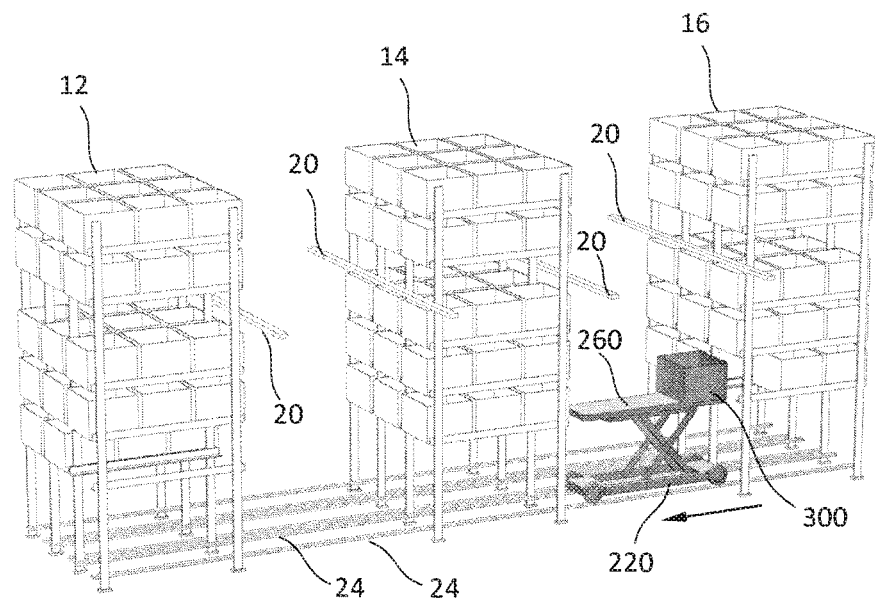
Figure 13:
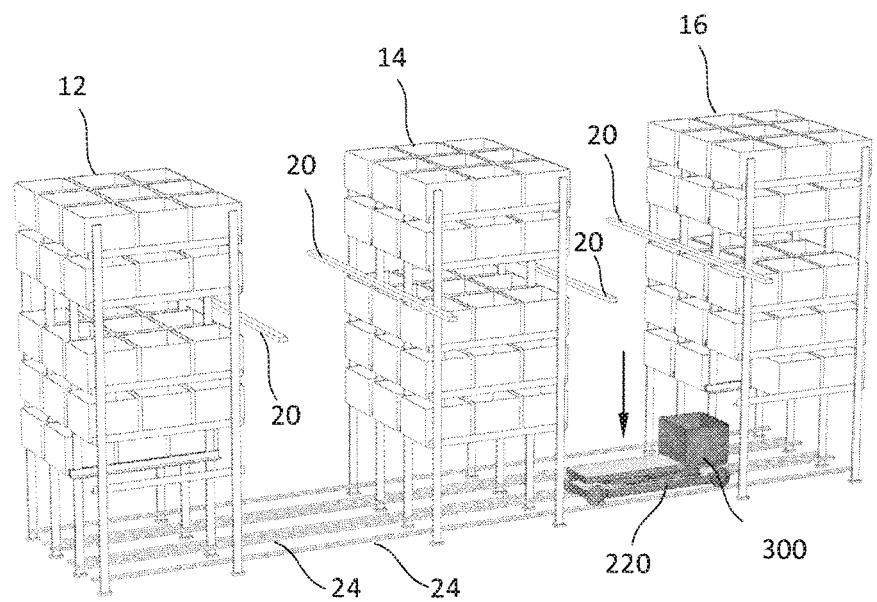

As shown in FIG. 10, the container carriage 22 with the folded board 260 is moved in a position below the container 300. The board 260 is raised to place the container 300 on the board (FIG. 11). Then, the container carriage 22 with the container 300 is moved to a passage between the storage racks 16 and 14 (FIG. 12), where the board 260 is moved down (FIG. 13).

Figure 14:
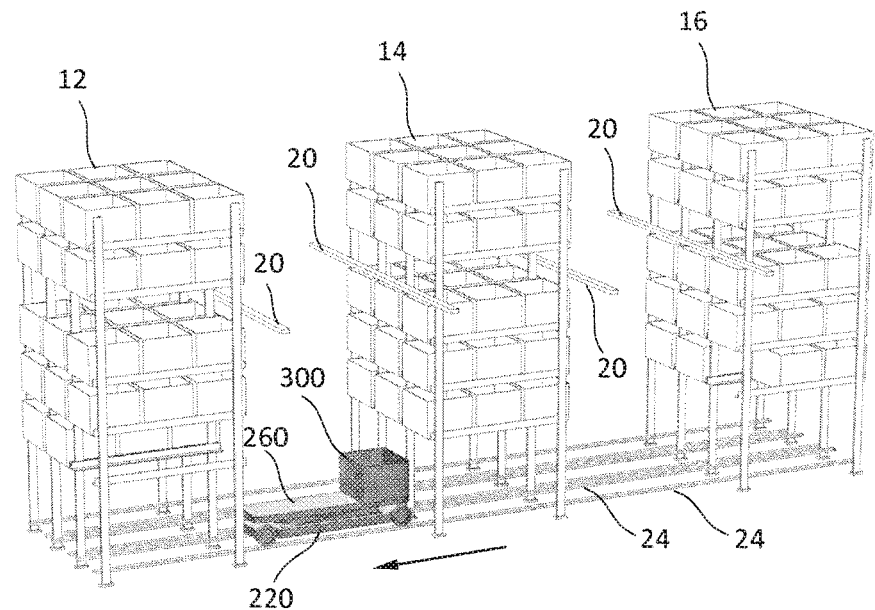
Figure 15:
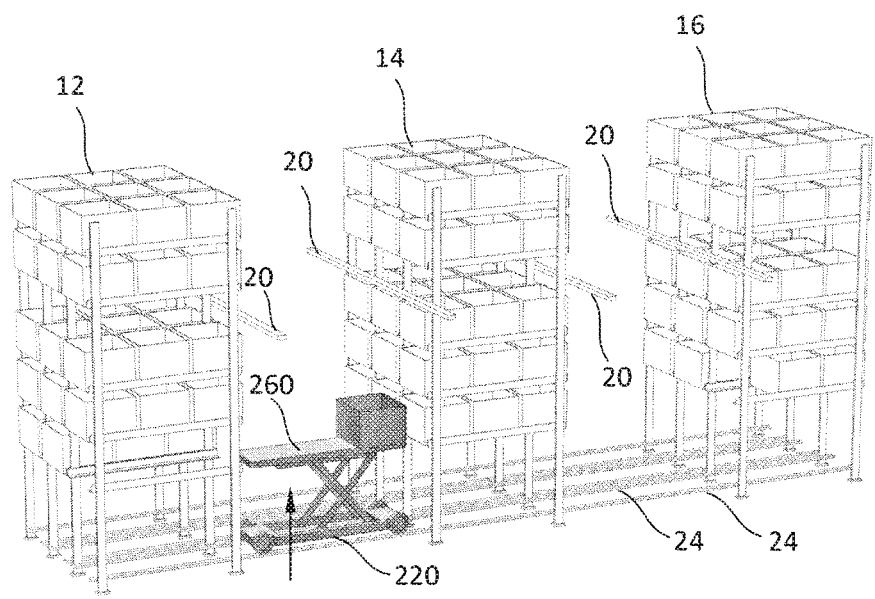

As shown in FIG. 14, the container carriage 22 with the folded board 260 and container 300 is moved along the rails 24 under the lowest row of the storage rack 14 to a selected location in the passage between the storage racks 12 and 14. Thereafter, the board 260 is raised slightly above the lowest vertical level of the row at which the container 300 should be placed (FIG. 15).

Figure 16:
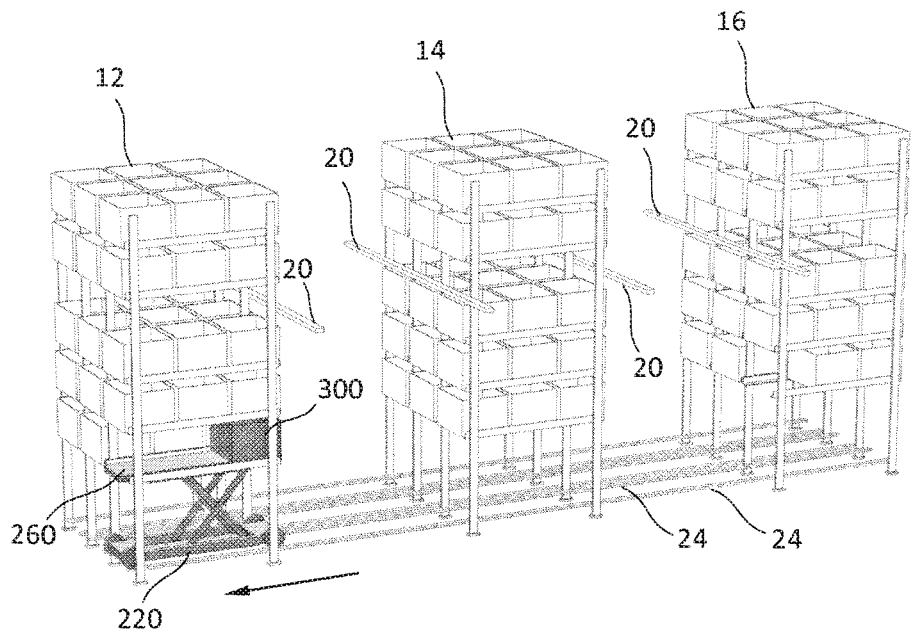
Figure 17:
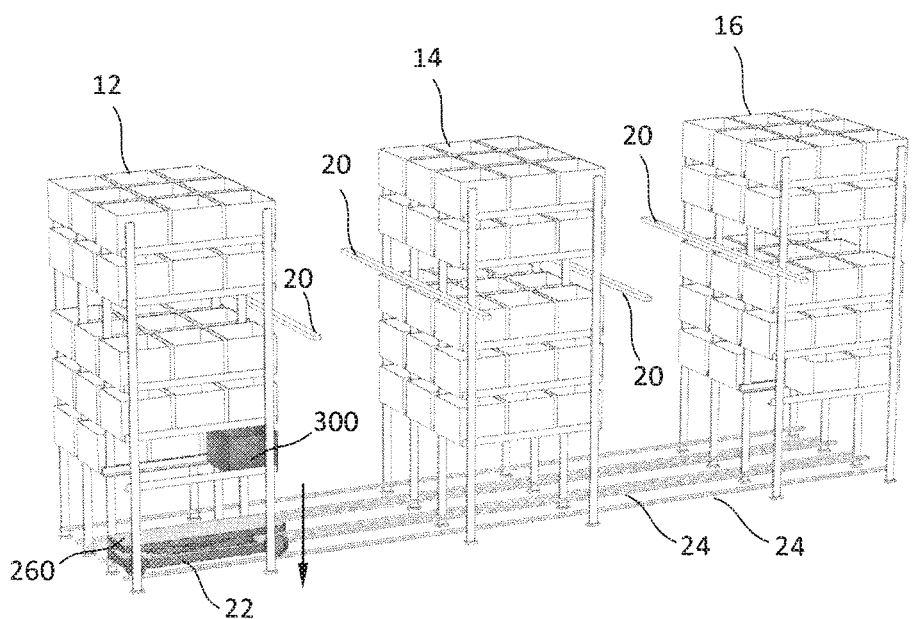

Then, as shown in FIG. 16, the container carriage 22 with the raised board 260 is moved along the rails 24 in the direction of the storage rack 12 to place the container 300 on the board 260 to a position corresponding to the storage location at which the container 300 should be placed. Thereafter, the board 260 is lowered down leaving the container 300 held by holding elements of the storage rack 12 (FIG. 17).

Hence, the storage system 10 of the present disclosure may provide a point-to-point transfer of a selected container 300 from a starting point at which the container 300 is stored to a transit point at a selected row of a selected storage rack, and from the transit point to a destination point at the selected row of a storage rack which is not adjacent to the storage rack from which the container 300 is delivered.

The transfer procedures may be controlled by a control unit including a data processor responsive to external commands for processing the commands and producing various control signals.

FIGS. 18-33 illustrate an exemplary sequencing procedure of the present disclosure that may be implemented in the storage system 10 to deliver containers to a selected destination point in a desired sequence. For example, a desired sequence of containers C1 to C6 stored in various storage racks may be delivered to a picking area where a picking device or operator fulfills an order by collecting different ordered items from various containers delivered to the picking area. The picking area may be arranged adjacent to a selected storage row in the storage rack 18. The sequencing procedure may be controlled by a central processing unit that executes a software program defining operations of the sequencing procedure.

FIGS. 18-33 show an example of a sequencing procedure performed using a single container carriage 22. As discussed later, the sequencing procedure may be also implemented using multiple container carriages 22. Also, to maintain the clarity of the drawings, the lifting transportation devices used for implementing the sequencing procedure are not shown.

Figure 18:
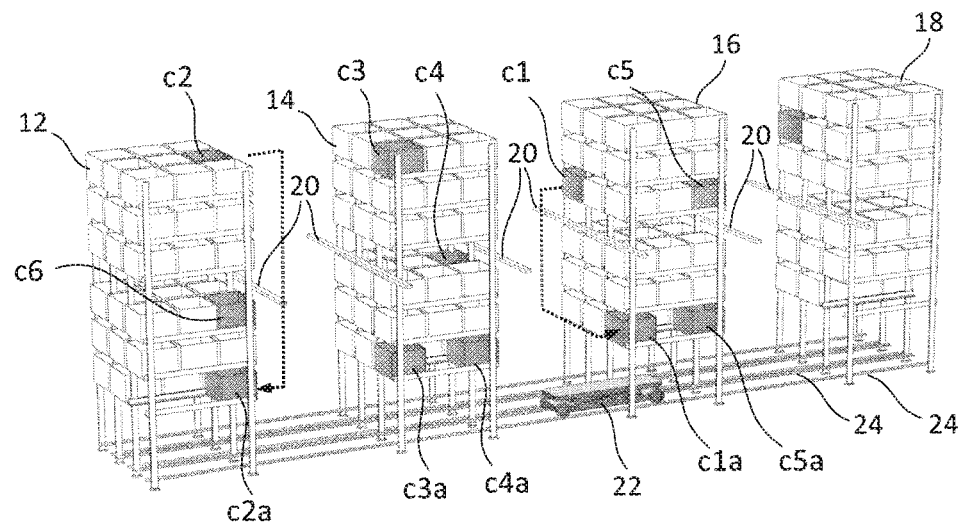
FIGS. 18-33 show an example of a sequencing procedure of the present disclosure performed using a single container carriage.

Referring to FIG. 18, a lifting transportation device (not shown) movable along the rails 20 between the storage racks 14 and 16 may transfer container C1 stored in the storage rack 16 to storage location C1a in the selected storage row above rails 24 used for a container carriage 22 selected for implementing the sequencing procedure. At the same time, the lifting transportation device that operates along the rails 20 between the storage racks 12 and 14 may transfer container C2 storage in the storage rack 14 to storage location C2a in the selected storage row above the rails 24 for the selected container carriage 22. Simultaneously with operations of the lifting transportation devices, the selected container carriage 22 with a folded board may be moved along the rails 24 to a position below the storage location C a.

Figure 19:
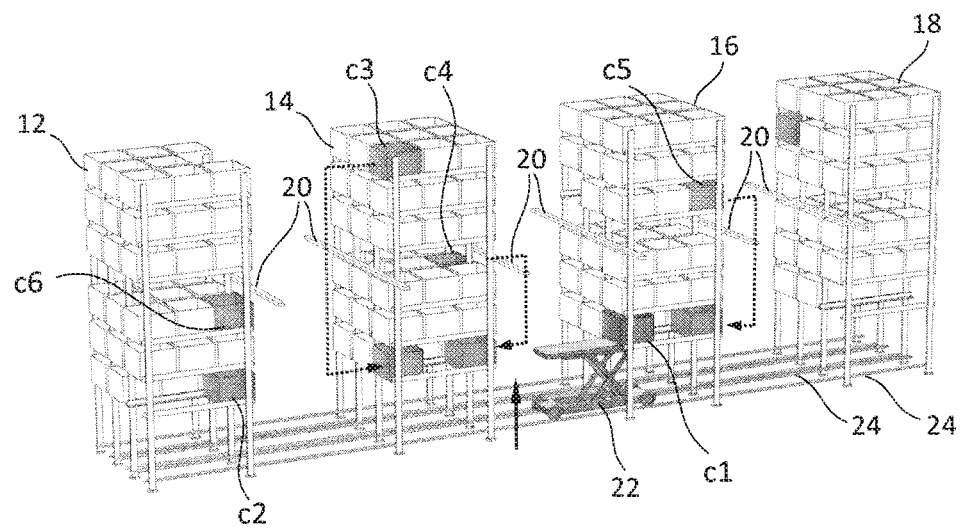

As shown in FIG. 19, the board of the container carriage 22 is raised to place the container C1 on the board. At the same time, the respective lifting transportation devices may move containers C3 and C4 down to storage locations C3a and C5a in the selected storage row.

Figure 20:
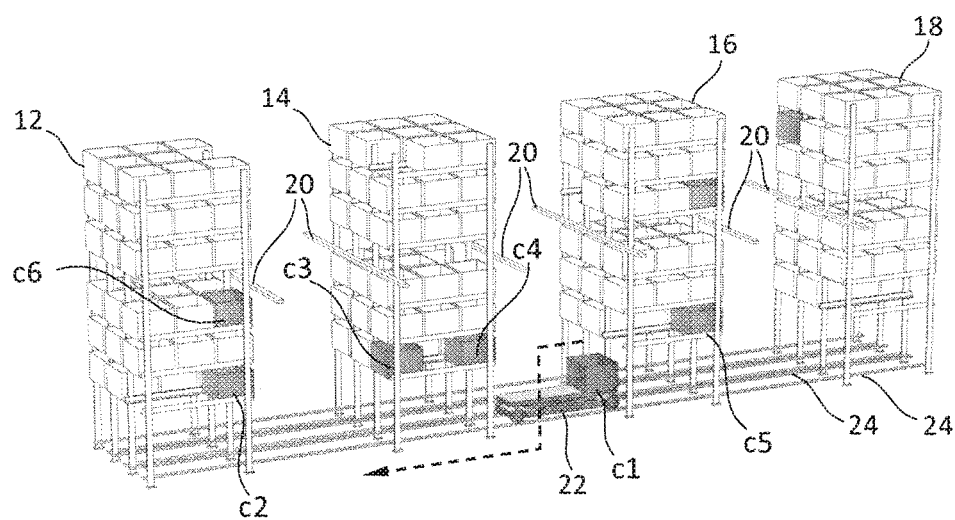
Figure 21:
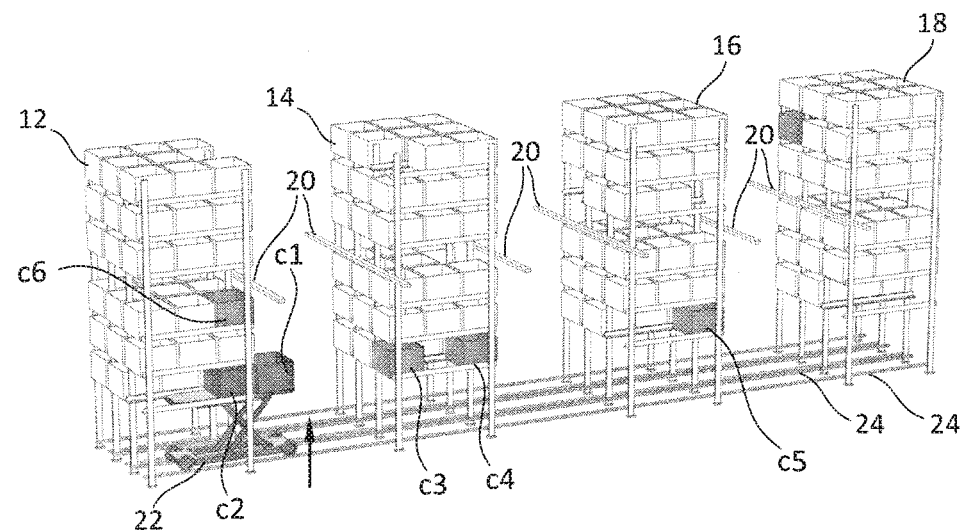

Referring to FIG. 20, the container carriage 22 is controlled to move down its board carrying container C1, and to go along the rails 24 toward a position below the storage location C2a where the container C2 is held. When the container carriage 22 reaches the position below the location C2a, its board is raised to place container C2 on the board, together with container C1 (FIG. 21).

Figure 22:
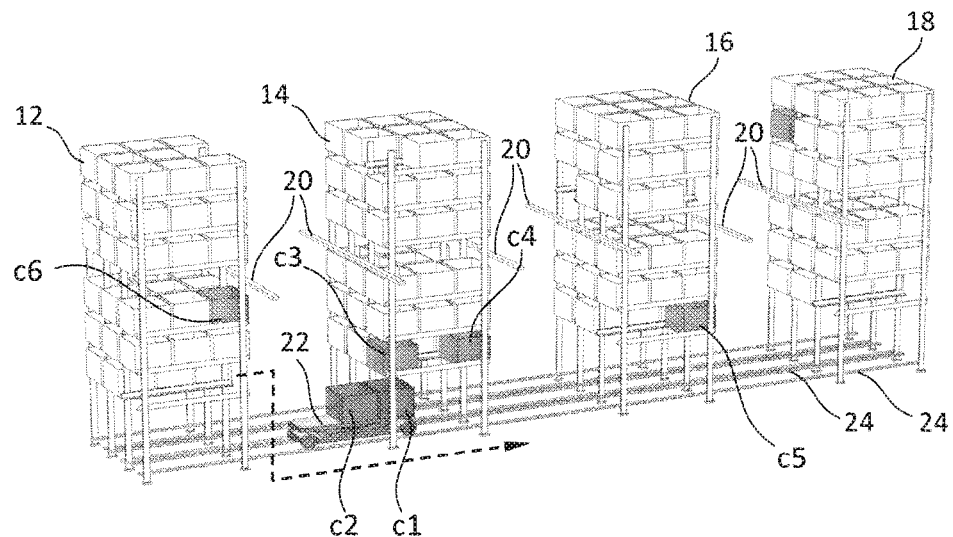
Figure 23:
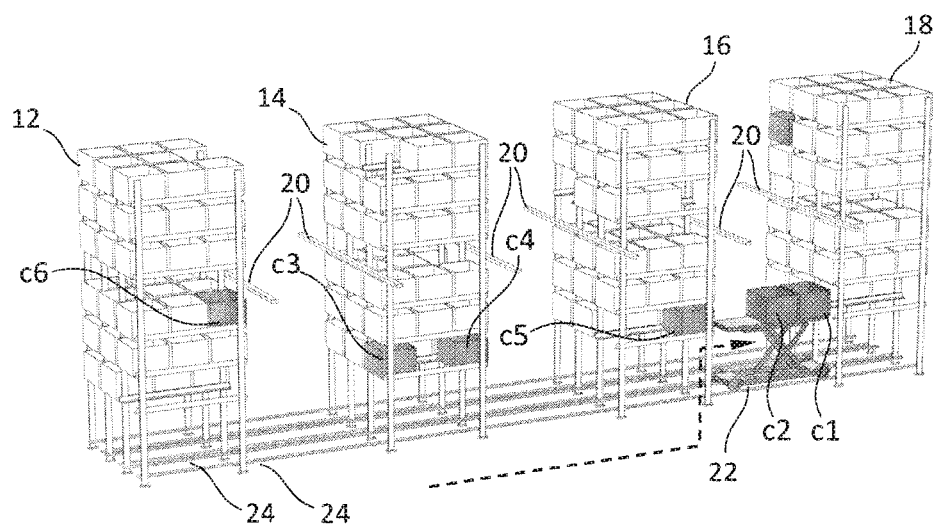

Thereafter, as shown in FIG. 22, the container carriage 22 with the containers C1 and C2 on the folded board is moved under the rows of the storage racks 14 and 16 toward the selected destination point. When the container carriage 22 reaches the passage between the racks 16 and 18, its board is raised to place container C1 followed by container C2 to the selected row of the storage rack 18 (FIG. 23). Thereafter, container C1 followed by container C2 may be transferred to the picking area adjacent to the selected row of the storage rack 18.

Figure 24:
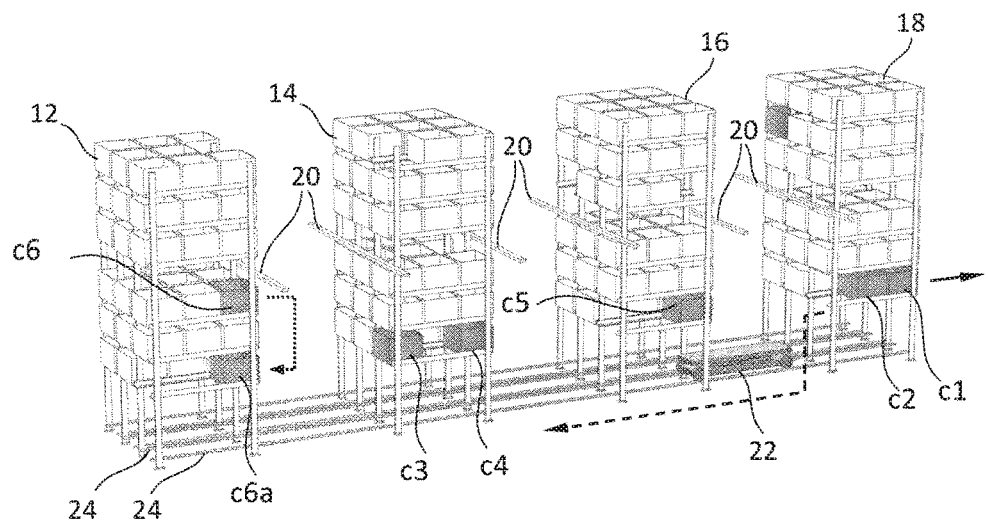

As shown in FIG. 24, after removing containers C1 and C2, the container carriage 22 is moved toward a position below the storage location C4a where container C4 is held. At the same time, container C6 may be moved by the respected lifting transportation device to storage location C6a in the selected row of the storage rack 12.

Figure 25:
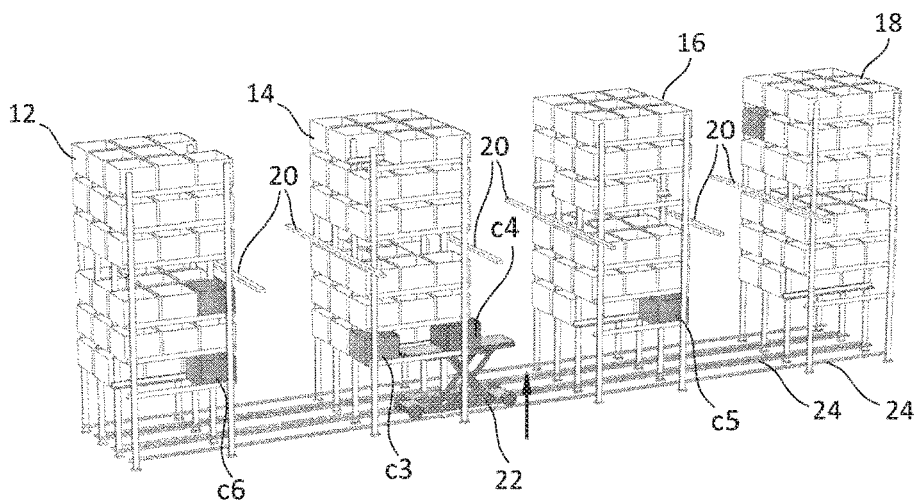
Figure 26:
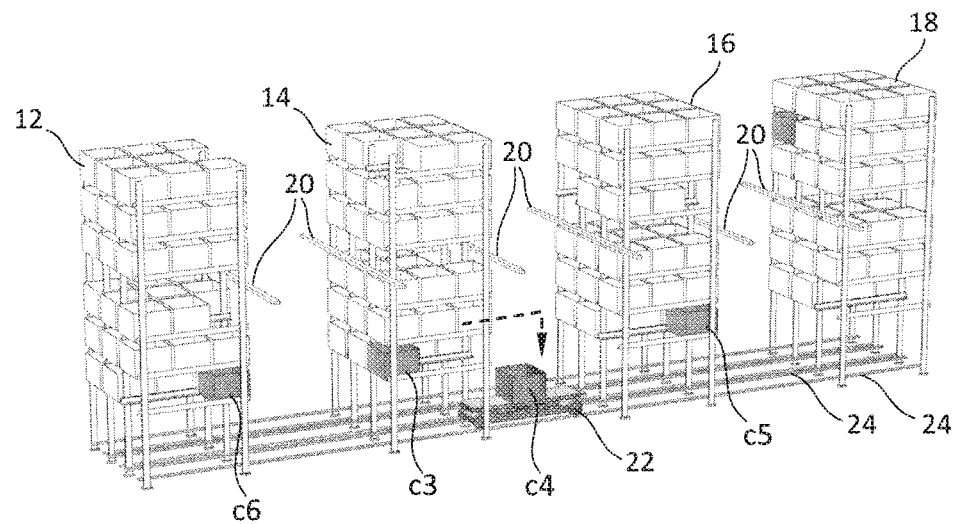

As illustrated in FIG. 25, after the container carriage 22 reaches the position below container C4, its board is raised to place container C4 on the board. Then, the container carriage 22 may be transferred to the passage between racks 14 and 16 to lower its board that carries container C4 (FIG. 26).

Figure 27:
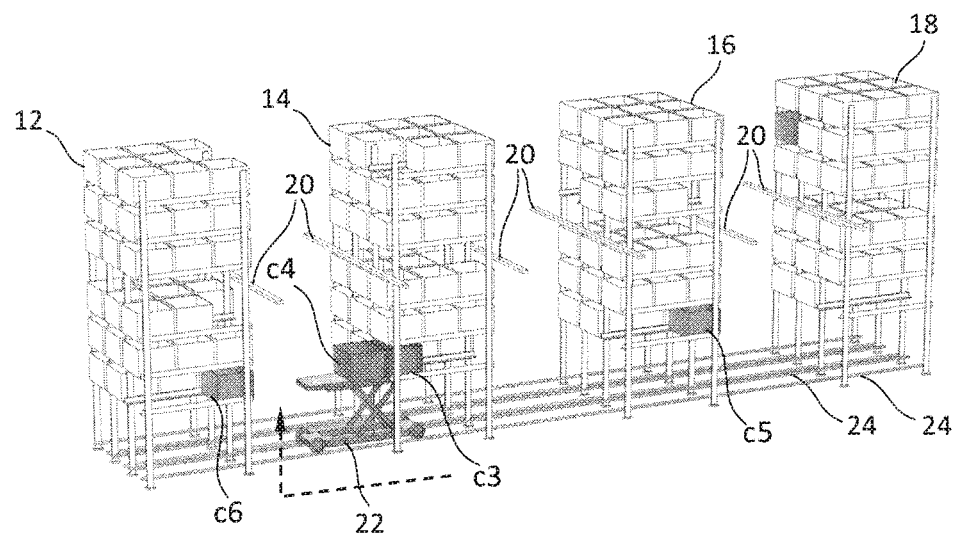

Then, the container carriage 22 with container C4 may be moved below the rack 14 to a position below the storage location where container C3 is held, so as to position container C4 in the passage between the racks 12 and 14 (FIG. 27). Thereafter, the board is raised to place container C3 in front of the container C4.

Figure 28:
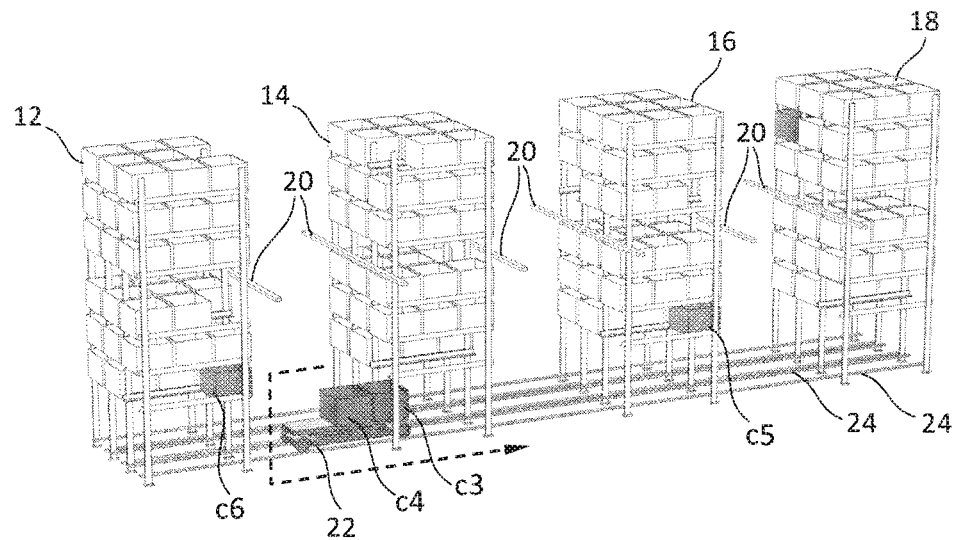

As shown in FIG. 28, the container carriage 22 is moved to position both containers C3 and C4 in the passage between the racks 12 and 14. Then, the board is lowered to carry containers C3 and C4 under the racks 14 and 16 toward the rack 18.

Figure 29:
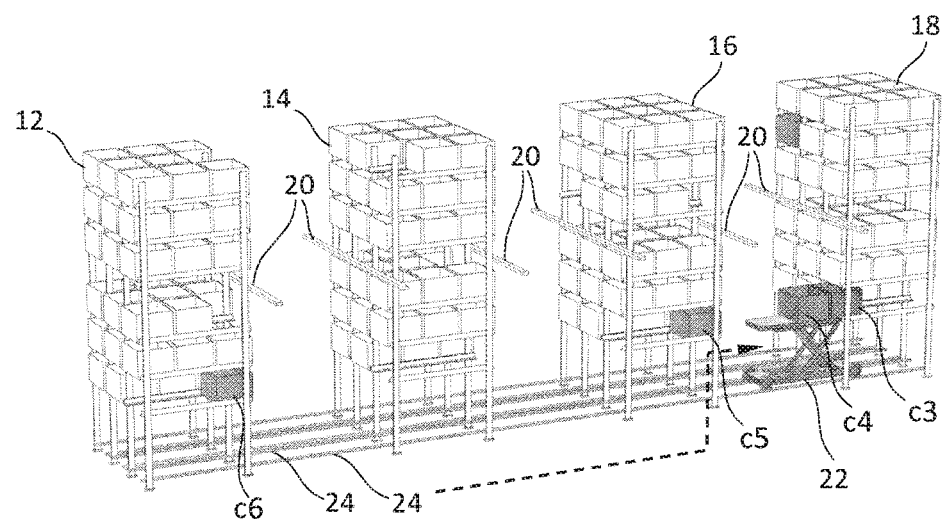

As shown in FIG. 29, when the carriage 22 reaches a position in which containers C3 and C4 are located in the passage between the racks 16 and 18, the board is raised to place container C3 followed by container C4 to the selected row in the storage rack 18. Thereafter, containers C3 and C4 may follow containers C1 and C2 into the picking area.

Figure 30:
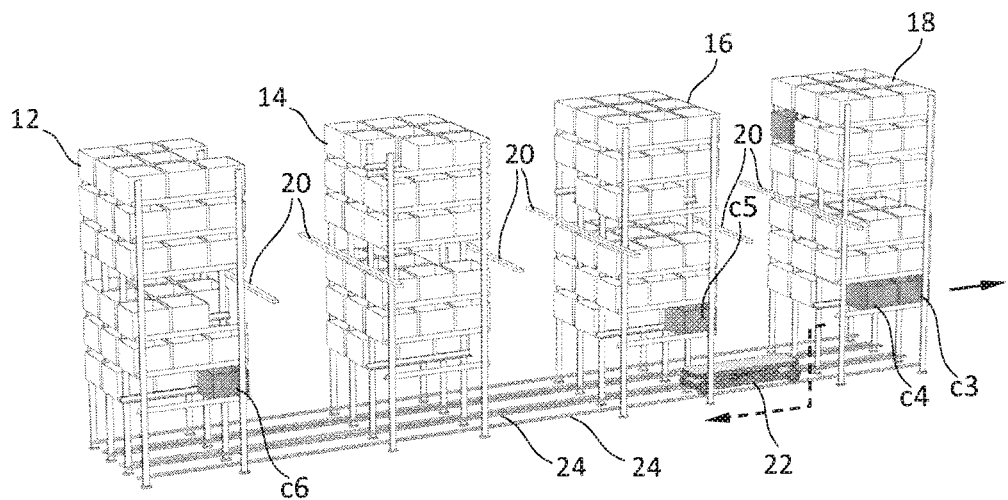
Figure 31:
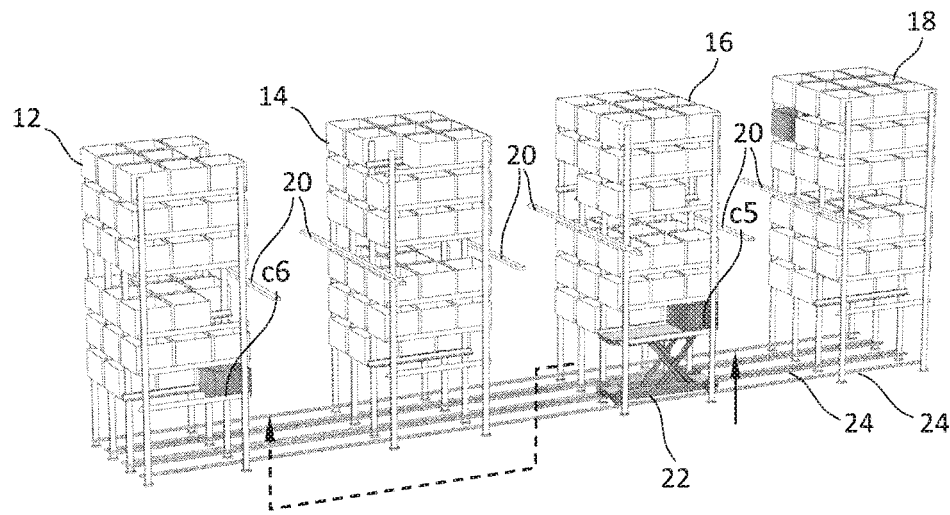

Referring to FIG. 30, after removing containers C3 and C4, the carriage 22 with the folded board is moved toward the storage location in which container C5 is held. After the board is raised to place container C5 on the board, carriage is moved to the passage between the racks 14 and 16, where the board is lowered to allow the carriage to pass under the rows of the rack 14 to the passage between the racks 12 and 14 (FIG. 31).

Figure 32:
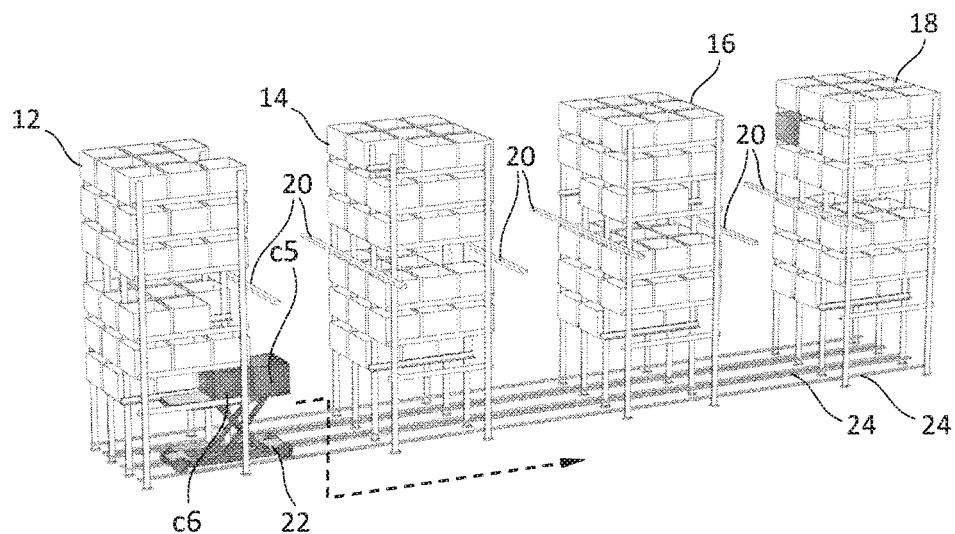

As shown in FIG. 32, when the carriage 22 carrying container C5 reaches a position below the storage location in which container C6 is held, the board is raised so as to place container C6 next to container C5. Then, the board is lowered to deliver containers C5 and C6 under the rows of the racks 14 and 16 to the passage between the racks 16 and 18.

Figure 33:
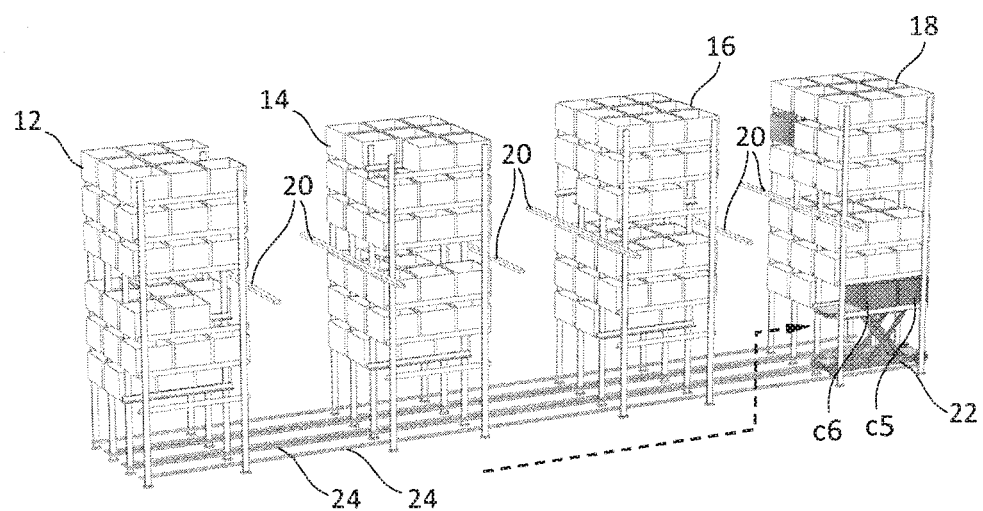
Figure 34:
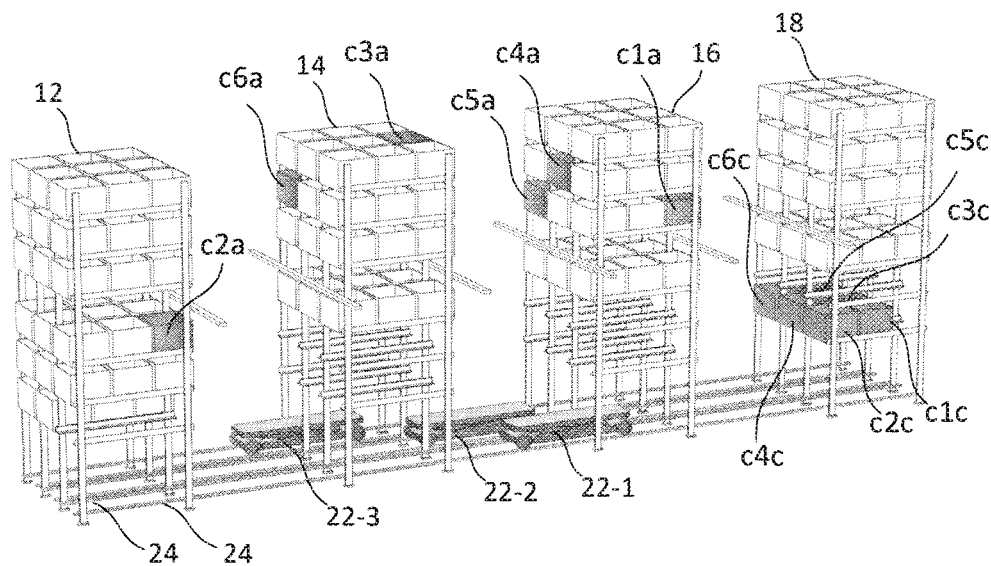
FIGS. 34-39 illustrate an example of a sequencing procedure of the present disclosure performed using multiple container carriages.

Thereafter, as shown in FIG. 33, the board is raised again to place container C5 followed by container C6 to the selected row in the rack 18. Then, containers C5 and C6 may follow containers C1, C2, C3 and C4 into the picking area.

FIGS. 34-39 illustrate another example of the sequencing procedure of the present disclosure that may be implemented in the storage system 10 to deliver containers to a selected destination point in a desired sequence. In this example, multiple container carriages 22 may be used for delivery a desired sequence of containers C1, C2, C3, C4, C5 and C6 respectively stored in storage locations C1a, C2a, C3a, C4a, C5a and C6a (FIG. 34) in various rows of storage racks 12, 14 and 16 to storage locations C1a, C2c, C3c, C4c, C5c and C6c in a selected row of a storage rack 18 adjacent to a picking area. The containers C1 to C6 may be divided into a number of subgroups corresponding to the number of container carriages 22 used for the sequencing procedure. For example, a container carriage 22-1 may be assigned for delivery the containers C1 and C2, a container carriage 22-2 may be assigned for transferring the containers C3 and C4, and a container carriage 22-3 may be assigned for transferring the containers C5 and C6.

Figure 35:
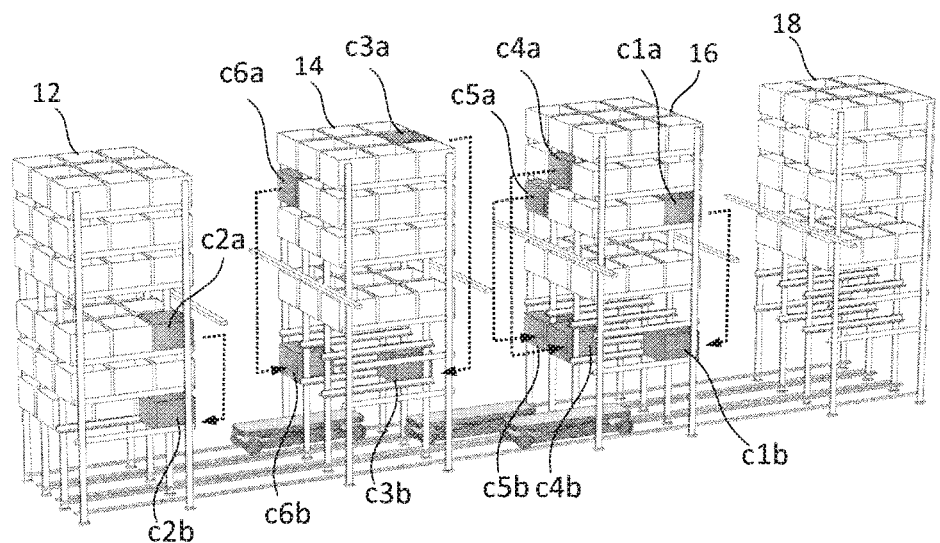

Referring to FIG. 35, the containers C1, C2, C3, C4, C5 and C6 are transferred by the respective lifting transportation devices (not shown) from the storage locations C1a, C2a, C3a, C4a, C5a and C6a to transit storage locations C1b, C2b, C3b, C4b, C5b and C6b in the selected row of the storage racks 12, 14 and 16. The storage locations C1b and C2b are provided above the rails 24 used for moving the container carriage 22-1, the storage locations C3b and C4b are arranged above the rails 24 used for the container carriage 22-2, and the storage locations C5b and C6b are provided above the rails 24 used for moving the container carriage 22-3.

Figure 36:
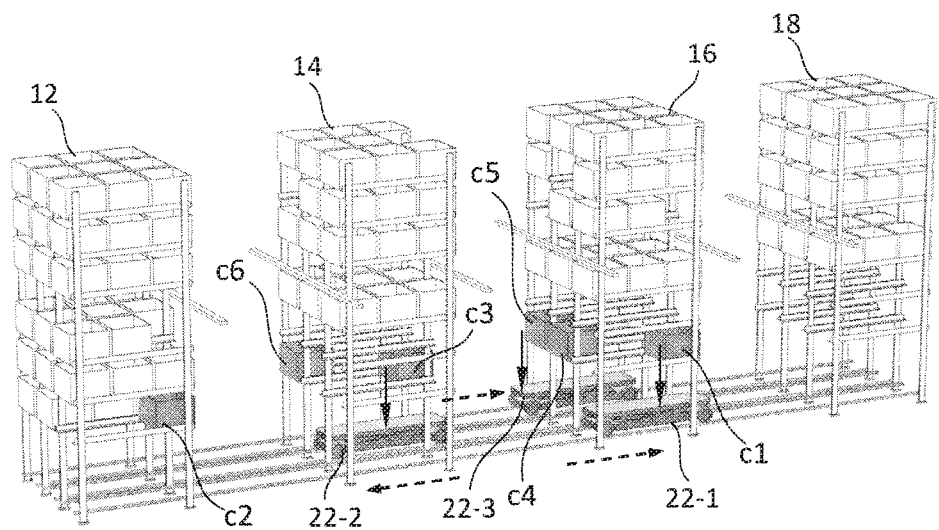

As shown in FIG. 36, the container carriage 22-1 may be moved to a position below the container C1 to take this container on its board, the container carriage 22-2 may be moved to a position below the container C3 to take this container, and the container carriage 22-3 may be moved to a position below the container C5 to take this container.

Figure 37:
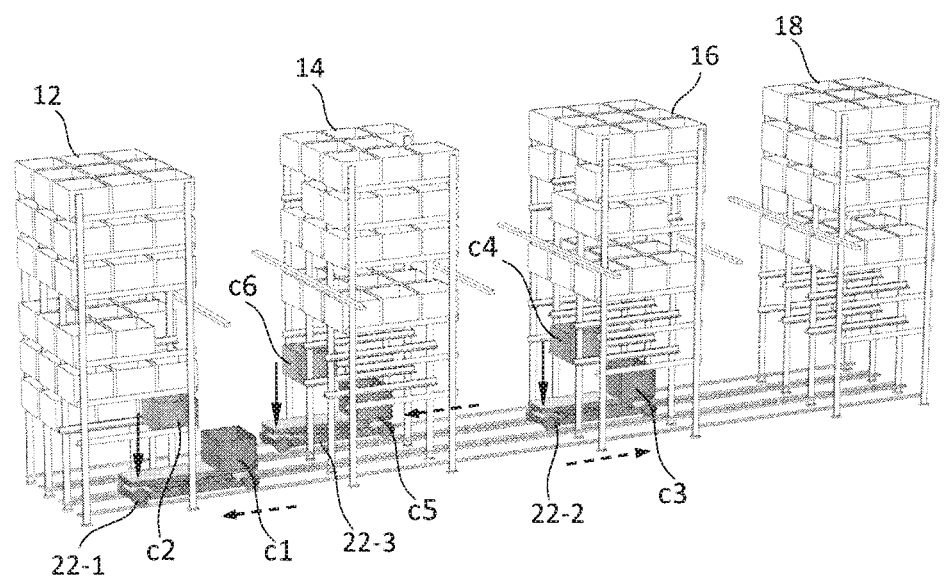

Referring to FIG. 37, the carriage 22-1 with the container C1 is moved to the position below the container C2 to place this container next to the container C1, the carriage 22-2 with the container C3 is moved to the position below the container C4 to place this container next to the container C3, and the carriage 22-3 with the container C5 is moved to the position below the container C6 to place this container next to the container C5.

Figure 38:
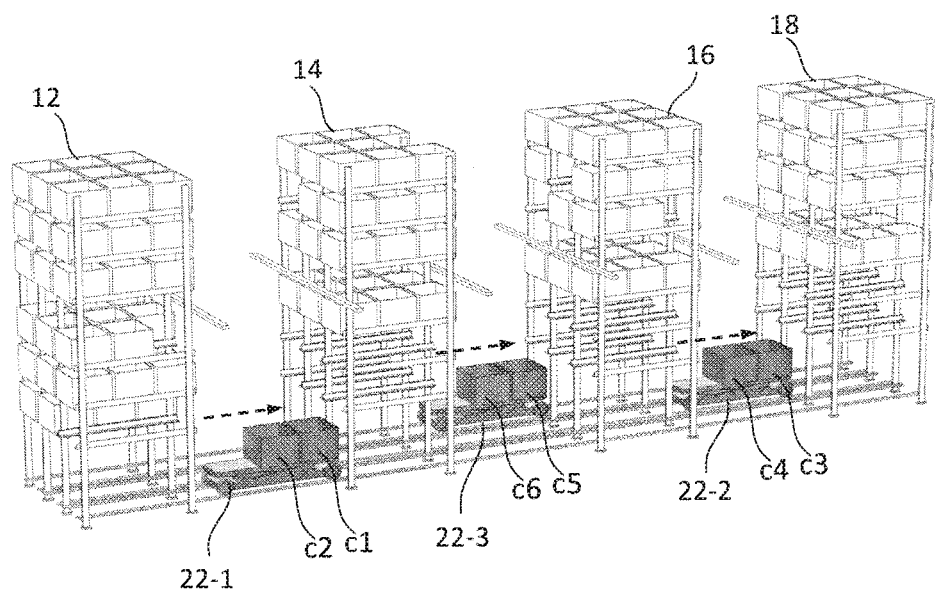
Figure 39:
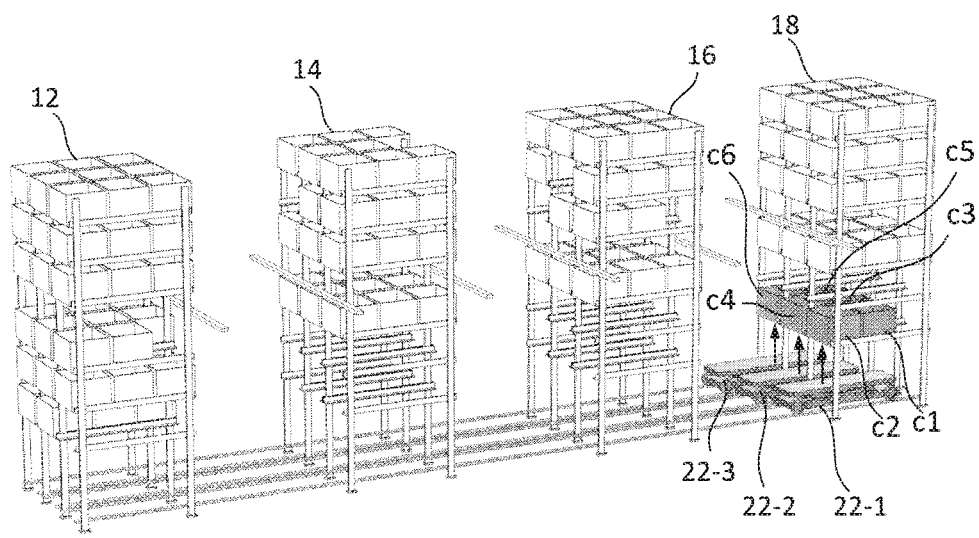

As shown in FIG. 38, the carriage 22-1 with the containers C1 and C2, the carriage 22-2 with the containers C3 and C4, and the carriage 22-3 with the containers C5 and C6 are moved in the direction of the storage rack 18. Referring to FIG. 39, the containers C1. C2. C3, C4 and C5, C6 are unloaded from the respected carriages 22-1, 22-2 and 22-3 to the storage locations in the selected row of the storage rack 18. From these locations, they may be moved to the adjacent picking area.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A storage system comprising:
multiple storage sections, each configured for storing containers arranged in multiple rows at various horizontal levels with respect to ground;
multiple lifting transportation devices configured for moving in a first horizontal direction along pairs of first rails arranged at predetermined horizontal levels in passages between the storage sections so as to have access to containers arranged in the storage sections, each lifting transportation device being movable along a corresponding pair of the first rails between adjacent storage sections and including a container access mechanism movable in a vertical direction with respect to the corresponding pair of rails so as to take a container stored in the adjacent storage sections and place the container to a selected row of the adjacent storage sections; and
at least one container carriage configured for moving in a second horizontal direction substantially perpendicular to the first horizontal direction, the container carriage including a mechanism for lowering the container placed in the selected row, located above a passage for moving the container in a second horizontal direction substantially perpendicular to the first horizontal direction, and moving the lowered container through the passage in the second horizontal direction,
wherein each lifting transportation device and the at least one container carriage are configured for moving in different horizontal planes with respect to the ground so as to avoid interferences between the lifting transportation devices and the at least one container carriage, and
each of the lifting transportation devices and the at least one container carriage are configured for placing containers in and retrieving containers from the selected row of the storage sections that is arranged at a horizontal level below a horizontal plane for moving each lifting transportation device and above the passage for moving the at least one container carriage in the second horizontal direction substantially perpendicular to the first horizontal direction.

2. The system of claim 1, wherein the at least one container carriage is movable in the second horizontal direction along one or more second rails.

3. The system of claim 2, wherein the first rails are arranged above the selected row of the storage sections, and the second rails are arranged below the selected row.

4. The system of claim 3, wherein the at least one container carriage includes a board for carrying the containers, and the container carriage is configured for raising the board so as to take the container from the selected row.

5. The system of claim 4 including multiple container carriages movable along respective pairs of the second rails arranged below the selected row of the storage sections.

6. The system of claim 1, wherein the mechanism of the container carriage is configured for access only to containers in rows of the storage sections located below the horizontal plane of the respective first rails for moving each lifting transportation device.

7. The system of claim 1, wherein the selected row is a lowest row of the storage sections, and the mechanism of the container carriage is configured for access only to containers in the lowest row of the storage sections from among rows of the storage sections.

8. A method of transferring containers in a desired order using multiple lifting transportation devices movable along respective pairs of first rails in a first horizontal direction in passages between storage sections configured for storing containers arranged in multiple rows at various horizontal levels with respect to ground, and using at least one container carriage movable in a second horizontal direction substantially perpendicular to the first horizontal direction, the method comprising the steps of:
selecting a group of containers stored in the storage sections for transferring to a predetermined destination in a prescribed order,
controlling at least one of the multiple lifting transportation devices to move the containers of the selected group in a vertical direction to a selected row of the storage sections located above a passage for moving the containers in a second horizontal direction substantially perpendicular to the first horizontal direction, and
controlling the at least one container carriage to sequentially lower the containers of the selected group from the selected row, located above the passage, to the passage and for moving the containers in the passage in the second horizontal direction for delivery to the predetermined destination in the prescribed order,
wherein each of the lifting transportation devices and the at least one container carriage are configured for placing containers in and retrieving containers from the selected row of the storage sections that is arranged at a horizontal level above the passage for moving the at least one container carriage in the second horizontal direction substantially perpendicular to the first horizontal direction.

9. The method of claim 8, wherein the containers are transferred using multiple container carriages movable in the second horizontal direction.

10. The method of claim 9, further comprising:
dividing the selected group of containers into a number of subgroups,
controlling the at least one of the multiple lifting transportation devices to move the containers of the subgroups in a vertical direction to the selected row of the storage sections,
assigning a different container carriage of the at least one container carriage to each of the subgroups, and
controlling each assigned container carriage to move containers of a corresponding subgroup from the selected row in a direction of the predetermined destination so as to deliver the containers of the selected group in the prescribed order.

11. The method of claim 10, wherein the container carriages are movable along respective pairs of the second rails.

12. The method of claim 8, wherein each lifting transportation device and the at least one container carriage are movable in different horizontal planes with respect to the ground so as to avoid interferences between the lifting transportation devices and the at least one container carriage.

13. The method of claim 12, wherein the selected row of the storage sections is arranged at a horizontal level between a horizontal plane for moving a lifting transportation device and a horizontal plane for moving the at least one container carriage.

14. The method of claim 13, wherein the at least one container carriage is movable in the second horizontal direction along a pair of second rails.

15. The method of claim 14, wherein the first rails are arranged above the selected row of the storage sections, and the second rails are arranged below the selected row.

16. The method of claim 8, wherein the controlling the at least one container carriage comprises controlling a mechanism of the at least one container carriage to access only containers in rows of the storage sections located below the horizontal plane of the respective first rails for moving each lifting transportation device.

17. The method of claim 8, wherein the selected row is a lowest row of the storage sections, and the controlling the at least one container carriage comprises controlling a mechanism of the at least one container carriage to access only to containers in the lowest row of the storage sections from among rows of the storage sections.

* * * * *